United States Patent
Beard et al.

(10) Patent No.: US 7,529,976 B2
(45) Date of Patent: May 5, 2009

(54) MULTIPLE SUBSYSTEM ERROR REPORTING

(75) Inventors: Jonathan Douglas Beard, Tucson, AZ (US); Louis Daniel Echevarria, Tucson, AZ (US); Andrew Gary Hourselt, Tucson, AZ (US); Robin Daniel Roberts, Tucson, AZ (US); Kerri Renee Shotwell, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 11/437,061

(22) Filed: May 20, 2006

(65) Prior Publication Data

US 2007/0294604 A1    Dec. 20, 2007

(51) Int. Cl.
*G06F 11/00* (2006.01)
*G06F 11/30* (2006.01)

(52) U.S. Cl. .................. 714/31; 714/43; 714/4
(58) Field of Classification Search ............ 714/26, 714/31, 4, 39, 43
See application file for complete search history.

(56) References Cited

U.S. PATENT DOCUMENTS

| | | | | |
|---|---|---|---|---|
| 5,519,830 A | * | 5/1996 | Opoczynski | 714/4 |
| 5,537,653 A | * | 7/1996 | Bianchini, Jr. | 714/25 |
| 6,772,376 B1 | * | 8/2004 | Merkin et al. | 714/48 |
| 6,810,496 B1 | * | 10/2004 | Vittal | 714/57 |
| 6,973,595 B2 | * | 12/2005 | Kaminsky et al. | 714/43 |
| 7,340,649 B2 | * | 3/2008 | Angamuthu et al. | 714/27 |
| 2003/0014693 A1 | * | 1/2003 | Goodman et al. | 714/31 |
| 2005/0083834 A1 | * | 4/2005 | Dunagan et al. | 370/221 |
| 2005/0262382 A1 | * | 11/2005 | Bain | 714/4 |
| 2006/0107086 A1 | * | 5/2006 | Walker et al. | 714/4 |

\* cited by examiner

*Primary Examiner*—Scott T Baderman
*Assistant Examiner*—Joseph Schell
(74) *Attorney, Agent, or Firm*—John H. Holcombe

(57) ABSTRACT

To log errors of a plurality of subsystems, a master reporting tool provides a table identifying the subsystems and their interface protocol addresses with respect to a network. A subsystem reports errors, via the network, to the master reporting tool, and the reporting subsystem identifies and reports other subsystems associated with the errors, if any, to the master reporting tool. The master reporting tool employs the interface addresses of the table to request reportable data from the other subsystems identified by the originally reporting subsystem as associated with the reported error. The network may be separate from a data handling network of the data handling system.

3 Claims, 3 Drawing Sheets

MULTIPLE SUBSYSTEM ERROR REPORTING

FIELD OF THE INVENTION

This invention relates to a plurality of subsystems communicating in a network, and, more particularly, to reporting errors relating to the subsystems.

BACKGROUND OF THE INVENTION

Subsystems of data handling systems, such as subsystems for handling and storing data, may be arranged in a private network, such as an Ethernet network, and are arranged to report their errors, for example, via the network, to a master console. The master console logs the error and may send an error report to a service dispatch station. From there, a trained service person may be dispatched to repair the reporting subsystem. The subsystem preserves an error log about the error and may preserve a log of its activities at the time of the error, and the service person will review the log(s). If the error affected or was caused by other subsystems, activity logs of those subsystems may be useful. The other subsystem may overwrite the activity logs due to heavy usage and, depending on the time it takes for the service person to arrive, the logs may not be available.

SUMMARY OF THE INVENTION

Methods, data handling systems, and computer program products report errors of a plurality of subsystems and actions of associated subsystems. The subsystems each comprise at least one processing system configured to communicate via a network. In one embodiment, a master reporting tool provides a table identifying the plurality of subsystems and their interface protocol addresses with respect to the network. The subsystems provide reportable data regarding actions of the subsystem. A subsystem reports errors, via the network, to the master reporting tool, and the reporting subsystem identifies and reports, via the network, other subsystems associated with the errors, if any, to the master reporting tool. The master reporting tool employs the interface addresses of the table to request, via the network, reportable data from the other subsystems identified by the originally reporting subsystem as associated with the reported error.

In a further embodiment, the network is separate from a data handling network of the data handling system.

In a still further embodiment, the master reporting tool requests the reportable data from the associated subsystems under an error code arranged to cause the associated subsystem to report the reportable data as though the associated subsystem had an error.

In another embodiment, the subsystems report the reportable data requested by the master reporting tool under an error code labeling the reportable data as though the original error reporting subsystem was reporting the requested reportable data.

In still another embodiment, the master reporting tool gathers the reported data from the original reporting subsystem and the associated subsystems; and the master reporting tool provides the reported data as though the reportable data is from an error of a single one of the subsystems.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
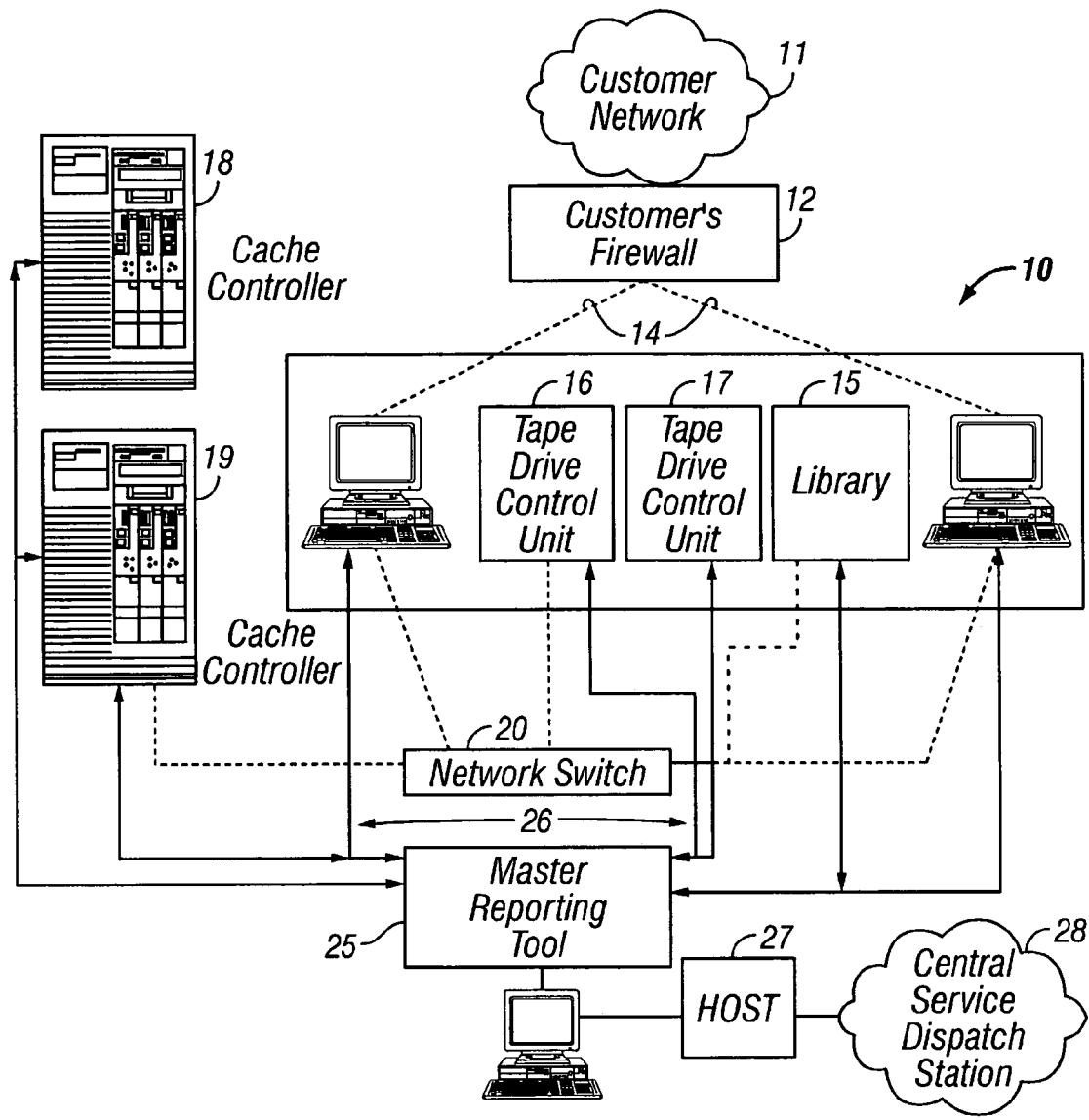
FIG. 1 is a diagrammatic illustration of an example of data handling system embodying the present invention.

FIG. 1 illustrates an example of a data handling system 10 which, in the example, provides data storage for a customer network 11 communicating via a customer's firewall 12 and a network 14.

The data handling system 10 comprises a plurality of subsystems. Examples of subsystems comprise a library 15, such as the IBM® 3584 tape library; tape drive control units 16 and 17, such as with the tape drives located within the tape library; and cache controllers 18 and 19. Each of the subsystems comprises at least one processing system operated by computer instructions as is known to those of skill in the art. The subsystems communicate regarding data storage via a data handling network 20, as is known to those of skill in the art. In the example of a library, as is known to those of skill in the art, the library stores data storage cartridges in storage shelves and moves the cartridges between tape drives and the storage shelves. Customer data may be supplied to cache storage for quick retrieval, and subsequently transferred to library cartridges.

A master reporting tool 25 is also in communication with each of the subsystems via a network 26, for example, a private network separate from the data handling network 20. An example of a network 26 comprises an Ethernet network. A function of the master reporting tool 25 is to log errors within the system 10 and send error reports to a remote host 27 which forwards a report to a central service dispatch station 28, so that trained service personnel may be dispatched to repair problems. The connections to the remote host 27 and the central service dispatch station 28 may comprise any suitable connections, such as Internet, or network, or modem connectivity. Alternatively, the service dispatch station, host, and/or master reporting tool may be combined. The master reporting tool comprises at least one processing system operated by computer instructions as is known to those of skill in the art. The master reporting tool may comprise a service processor, separate PC, or integrated program.

Figure 2:
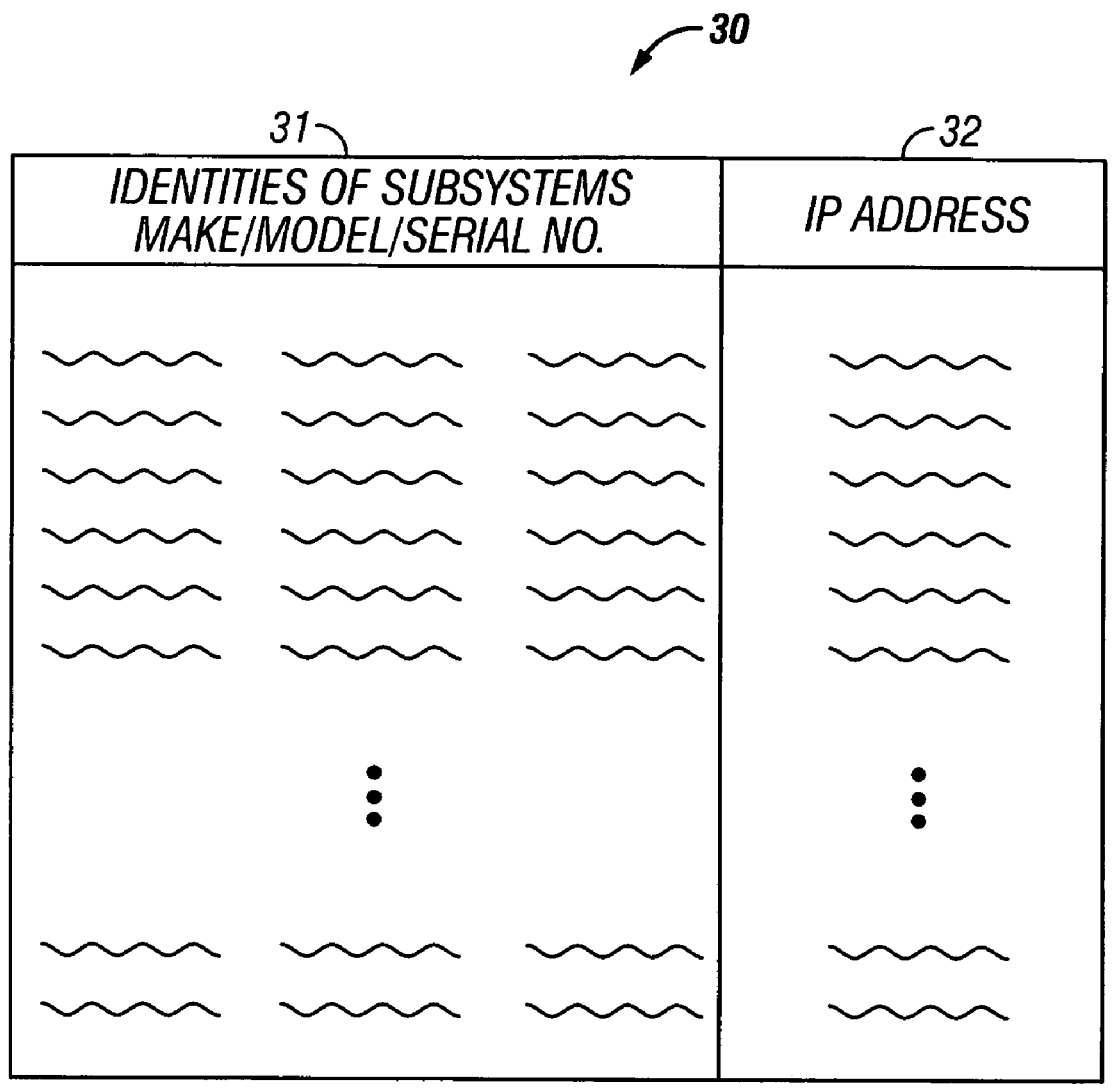
FIG. 2 is an embodiment of a table identifying the plurality of subsystems of FIG. 1 and their interface protocol addresses.

Referring additionally to FIG. 2, the master reporting tool 25 provides a table 30 to identify the subsystems within the system 10. A table may comprise a file, a correlation table, a listing, or other computer generated vehicle which identifies the subsystems. For example, the table 30 comprises property files which identify 31 the subsystems by each subsystem's make, model and serial number, and correlates each subsystem with its interface protocol address 32. The interface protocol address comprises the address employed with respect to the network 26.

In accordance with an embodiment of the present invention, new error codes are defined which allow the master reporting tool 25 to request reportable data, such as logs, from the subsystems. The new error codes are known to a subsystem, and computer instructions cause the subsystem to report the requested reportable data to the master reporting tool. Additional computer instructions cause the subsystems to identify and report other subsystems associated with errors of the subsystem, if any. For example, a subsystem may be in the process of storing or retrieving data involving another subsystem when an error occurs, such as transferring data from a cache subsystem 18 to a tape drive 17. As another example, a library 15 may be operating to move a data storage cartridge from a storage shelf to a tape drive per a command, for migrating and storing data from a cache subsystem 18.

Figure 3:
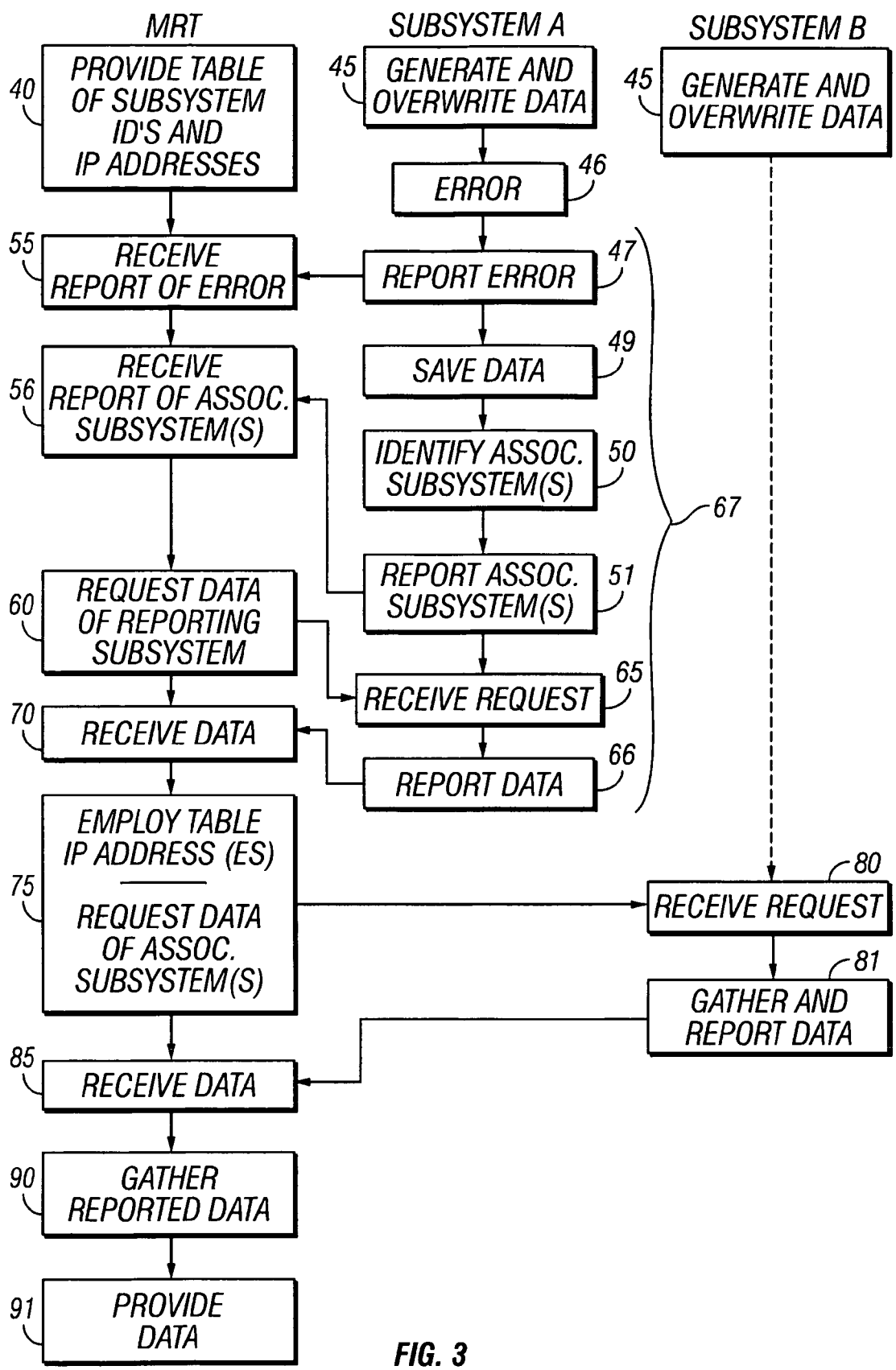
FIG. 3 is a flow chart depicting an embodiment of a method in accordance with the present invention.

Referring additionally to FIG. 3, the master reporting tool, in step 40, provides the table 30 of FIG. 2 identifying the plurality of subsystems and their interface protocol addresses with respect to the network 26. For example, during initial installation, each subsystem identifies itself to the master reporting tool, and the master reporting tool builds the table 30. Additionally, the master reporting tool identifies its address to each subsystem so that the subsystem may report to the master controller.

In steps 45, the subsystems generate data, such as logs, lists, images, etc., regarding actions of the respective subsystem. The data may be overwritten to conserve memory or storage as is known to those of skill in the art.

In step 46, a subsystem may have or detect an error, and, in step 47, reports the error, via the network, to the master reporting tool 25. When an error occurs in a group of attached subsystems, the error information needed to repair the subsystem may be spread across multiple subsystems. The speed at which the subsystems run means that the needed information may be overwritten by the attached subsystems before it can be gathered by conventional means, such as the intervention of service personnel.

In step 49, the subsystem having or detecting the error saves its reportable data regarding the error, as known to those of skill in the art.

In step 50, the subsystem having or detecting the error additionally identifies other subsystems associated with the error, if any. For example, the error may involve operation of the library 15 during communication with the cache controller 18 via network 20, and may involve the cache controller. In step 51, the reporting subsystem additionally reports, via the network 26, other subsystems associated with the errors, if any, to the master reporting tool 25. In the above example, in step 47, the library 15 reports the error to the master reporting tool 25; the library, in step 49, saves its reportable data; in step 50, the library identifies the cache controller 18 as another subsystem associated with the error; and, in step 51, reports, via network 26, the cache controller 18 as associated with the error. Steps 47-51 can be changed in the order that they occur or alternatively combined into fewer steps or a single step 67.

The master reporting tool 25, in step 55, receives, via network 26, the report of the error from the reporting subsystem. For example, the error is reported by means of an error code which may identify the type of error, and the error report may also provide the identity of the reporting subsystem. Alternatively, the identity of the reporting subsystem may be derived from the communication protocol of network 26. In step 56, the master reporting tool receives, via network 26, the report of the other subsystem(s) associated with the error, if any. This report includes an identity of the other subsystem(s). In the above example, the reporting subsystem is the library 15, and the identified other subsystem is the cache controller 18.

In step 60, the master reporting tool 25 requests the reportable data of the reporting subsystem that had been saved in step 49. In step 65, the reporting subsystem receives the request for its reportable data, and, in step 66, reports the data. Steps 65 and 66 may, alternatively be combined into step 67, thereby not requiring step 60.

In step 70, the master reporting tool 25 receives the reportable data from the reporting subsystem, and, in step 75, employs the table 30 to correlate the identity of the associated subsystem to its interface protocol address with respect to the network 26, and, using the interface protocol address, requests reportable data of the associated subsystem via network 26. The request comprises an error code arranged to cause the associated subsystem to report the data as though the associated subsystem had an error.

In the above example, the master reporting tool 25 requests reportable data of the library 15 as the reporting system, and receives the data via the network 26. Using the table 30, the master reporting tool 25, in step 75, correlates the identity of the associated subsystem, cache controller 18, to its interface protocol address with respect to the network 26, and, using the interface protocol address, requests reportable data of the associated subsystem, cache controller 18, via network 26.

In step 80, the associated subsystem receives the request for reportable data from the master reporting tool via the network 26, and, in step 81, gathers the reportable data and reports the data via network 26 to the master controller. As discussed above, the request for reportable data is to gather and report the data as though the receiving subsystem is the subsystem that failed. In addition, the report labels the gathered reportable data as though the original error reporting subsystem was reporting the requested data, for example, under an error code labeling the reportable data as though the original error reporting subsystem was reporting the requested data.

In the above example, the associated subsystem, cache controller 18, in step 80, receives the request for reportable data from the master reporting tool 25 via the network 26, and, in step 81, gathers the reportable data and reports the data via network 26 to the master reporting tool.

In step 85, the master reporting tool 25 receives the reportable data via the network 26 from the associated subsystem (s), for example, from cache controller 18.

In step 90, the master reporting tool 25 gathers the reported data from the original reporting subsystem and from the associated subsystem. For example, the master reporting tool packages the data into a problem report. Then, in step 91, the master reporting tool compresses and presents the reported data as though the data is from an error of a single subsystem, and provides the reportable data, for example, to a service dispatch station 28. In the above example, the reportable data from the library 15 and from the associated cache controller 18 are presented as though the data is from an error of a single subsystem, such as the original reporting subsystem 15.

The service personnel are thus presented with the information of the various subsystems of the system 10 that were involved when the error occurred.

Those of skill in the art will understand that changes may be made with respect to the ordering of the steps of the method of FIG. 3. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A data handling system comprising:
a plurality of subsystems, each comprising at least one processing system configured to: communicate via a network; generate data regarding actions of said subsystem; report errors of said subsystem, via said network; and identify and report, via said network, other subsystems associated with said errors of said subsystem, if any; and
a master reporting tool comprising at least one processing system configured to: comprise a table identifying said plurality of subsystems and interface protocol addresses with respect to said network; receive reports of errors; receive said reports identifying said associated subsystems; and employ said interface protocol addresses of said table to request, via said network, reportable data from said other subsystems identified by an original error reporting subsystem as associated with a reported error; wherein said network is separate from a data handling network of said data handling system; wherein an associated subsystem is configured to report errors, and said master reporting tool is configured to request said reportable data from said associated subsystems under an error code arranged to cause said associated subsystem to report said reportable data as though said associated subsystem had an error; and wherein said associated subsystems are configured to report said reportable data requested by said master reporting tool under an error code labeling said reportable data as though said original error reporting subsystem was reporting said requested reportable data.

2. A method for providing a service of requesting logs in a plurality of subsystems of a data handling system, comprising the steps of:
a master reporting tool providing a table identifying said subsystems of said plurality of subsystems and interface protocol addresses with respect to a network;
said subsystems each generating data regarding actions of said subsystem;
an original error reporting subsystem reporting at least one error, via said network, to said master reporting tool;
said reporting subsystem identifying and reporting, via said network, other subsystems associated with said at least one error, if any, to said master reporting tool; and
said master reporting tool employing said interface addresses of said table to request, via said network, reportable data from said other subsystems identified by said original error reporting subsystem as associated with said reported error;
wherein said reporting and requesting steps are conducted via said network separate from a data handling network of said data handling system;
wherein an associated subsystem is configured to report errors, and said master reporting tool requests said reportable data from said associated subsystems under an error code arranged to cause said associated subsystem to report said data as though said associated subsystem had an error; and
wherein said associated subsystems report said reportable data requested by said master reporting tool under an error code labeling at least one log as though said original error reporting subsystem was reporting said requested reportable data.

3. A computer program product tangibly embodied in a computer readable medium usable with a programmable computer, said computer program product having computer readable code embodied therein, comprising instructions for:
a master reporting tool providing a table identifying subsystems and interface protocol addresses with respect to a network;
said subsystems generating data regarding actions of said subsystem;
an original error reporting subsystem reporting at least one error, via said network, to said master reporting tool;
said reporting subsystem identifying and reporting, via said network other subsystems associated with said at least one error, if any, to said master reporting tool; and
said master reporting tool employing said interface addresses of said table to request, via said network, reportable data from said other subsystems identified by said original error reporting subsystem as associated with said reported error;
wherein said reporting and requesting steps are conducted via said network separate from a data handling network of said data handling system;
wherein an associated subsystem is configured to report errors, and said master reporting tool requests said reportable data from said associated subsystems under an error code arranged to cause said associated subsystem to report said reportable data as though said associated subsystem had an error; and
wherein said associated subsystems reports said reportable data requested by said master reporting tool under an error code labeling said reportable data as though said original error reporting subsystem was reporting said requested reportable data.

* * * * *